(12) United States Patent
Pugh et al.

(10) Patent No.: US 10,174,159 B2
(45) Date of Patent: Jan. 8, 2019

(54) FUNCTIONAL POLYMERS

(71) Applicants: Coleen Pugh, Akron, OH (US); Colin Wright, Kingwood, TX (US); Carolyn Scherger, Cuyahoga Falls, OH (US); Xiang Yan, Suizhou (CN); Zheng Zhang, Changzhou (CN); Zewei Wang, Atlanta, GA (US)

(72) Inventors: Coleen Pugh, Akron, OH (US); Colin Wright, Kingwood, TX (US); Carolyn Scherger, Cuyahoga Falls, OH (US); Xiang Yan, Suizhou (CN); Zheng Zhang, Changzhou (CN); Zewei Wang, Atlanta, GA (US)

(73) Assignee: The University of Akron, Akron ( * ) Notice: Subject to any disclaimer, the term of this patent is extended or adjusted under 35 U.S.C. 154(b) by 57 days.

(21) Appl. No.: 15/522,487

(22) PCT Filed: Nov. 2, 2015

(86) PCT No.: PCT/US2015/058596
§ 371 (c)(1),
(2) Date: Apr. 27, 2017

(87) PCT Pub. No.: WO2016/070175
PCT Pub. Date: May 6, 2016

(65) Prior Publication Data
US 2017/0335059 A1  Nov. 23, 2017

Related U.S. Application Data

(60) Provisional application No. 62/108,169, filed on Jan. 27, 2015, provisional application No. 62/073,515, filed on Oct. 31, 2014.

(51) Int. Cl.
*C08G 63/91* (2006.01)
*C08G 63/682* (2006.01)

(52) U.S. Cl.
CPC ....... *C08G 63/6822* (2013.01); *C08G 63/682* (2013.01); *C08G 63/91* (2013.01); *C08G 63/912* (2013.01)

(58) Field of Classification Search
USPC .......................................................... 528/302
See application file for complete search history.

(56) References Cited

U.S. PATENT DOCUMENTS

| | | |
|---|---|---|
| 5,229,279 A | 7/1993 | Peoples et al. |
| 2011/0046334 A1 | 2/2011 | Pugh et al. |
| 2013/0090442 A1 | 4/2013 | Pugh et al. |
| 2013/0184429 A1 | 7/2013 | Pugh et al. |

*Primary Examiner* — Terressa Boykin
(74) *Attorney, Agent, or Firm* — Renner Kenner Greive Bobak Taylor & Weber

(57) ABSTRACT

Methods of functionalizing α-halogenated hydroxy acid-based polymers and coupling α-halogenated hydroxy acid-based polymers are provided. Suitable α-halogenated hydroxy acid-based polymers include α-halogenated polyesters and α-halogenated acrylate-based inimers. Methods include coupling α-halogenated polyesters and functionalizing α-halogenated polyesters without polymer cleavage. Certain α-halogenated hydroxy acid-based polymers may be functionalized, crosslinked or, intiate polymerization by inducing the α-halogenated hydroxy acid-based polymers to make a dioxolenium ion intermediate. The α-halogenated hydroxy acid-based polymers may also be functionalized using a radical trap.

23 Claims, No Drawings

FUNCTIONAL POLYMERS

CROSS-REFERENCE TO RELATED APPLICATIONS

This application claims the benefit of U.S. Provisional Application No. 62/073,515 filed Oct. 31, 2014, and U.S. Provisional Application No. 62/108,169 filed Jan. 27, 2015, the contents both of which are incorporated herein by reference.

STATEMENT REGARDING FEDERALLY SPONSORED RESEARCH OR DEVELOPMENT

This invention was made with government support under grant CHE-1112326, DMR-0630301 and DMR-1006195 awarded by National Science Foundation. The government has certain rights in the invention.

FIELD OF THE INVENTION

One or more embodiments are directed to process for the functionalization and crosslinking of α-halogenated hydroxy acid-based polymers. The α-halogenated hydroxy acid-based polymers include polyesters prepared from α-halogenated hydroxy acid monomers and hyperbranched polyacrylates prepared from α-halogenated acrylate-based inimers.

BACKGROUND OF THE INVENTION

There is presently a preference in certain industries for degradable and bioabsorbable polymers over traditional polymers such as polystyrene and poly(ethylene terephthalate) (PET). Traditional biodegradable polymers incorporate a degradable linkage into the backbone that can be cleaved by hydrolytic, enzymatic and oxidative processes. Examples of traditional biodegradable polymers include polyamides, polyanhydrides, polycarbonates, polyesters, polyesteramides, and polyurethanes. Aliphatic polyesters, specifically poly(lactic acid) (PLA), poly(lactic-co-glycolic acid) (PLGA) and poly(ε-caprolactone) (PCL), have found use in biomedical soft material applications, such as drug and gene delivery, sutures, stents, dental implants and as tissue engineering scaffolding. Unfortunately, these polyesters may only be functionalized on the chain ends, and the conditions for preparing polyesters are not suitable to many functional groups. Presently, there is a need in the art to produce polyesters with properties that are tunable through pendant functionalization.

Hyperbranched polymers are another class of polymers where the ability to tune properties through functionalization is desired. Hyperbranched polymers are in the class of chemically similar polymers having different molecular architecture can exhibit various interesting properties that are different than the polymers of conventional architectures (like linear and branched, cross-linked polymers). Most importantly and distinctly, shear thinning behavior and lower viscosity of these polymers give processing advantages compared to the linear counterparts. This new class of architecture mainly consists of dendrimers and hyperbranched polymers. In contrast to dendrimers, which have uniform distribution of branches in three dimensions, hyperbranched polymers are characterized by random and non-uniform branching. It has been suggested in the reported literatures that dendrimers can successfully be employed in certain applications to achieve improved properties, especially processing properties. Due to lack of entanglements of the chains, the viscosity of these polymers is lower than that of linear polymers. Dendrimers are monodisperse (typically have polydispersity 1.02 or less) and synthesized with controlled step-growth reactions with tedious protection-deprotection strategies and purification. In contrast, hyperbranched polymers may be made from one-step, one-pot reactions and are polydisperse. This facilitates the synthesis of a large amount of polymers with higher yield at comparatively lower cost. Due to its imperfect branching and higher polydispersity, the properties of hyperbranched polymers lie between those of dendrimers and linear polymers. This wide window of properties between these of the two extreme architectures makes hyperbranched polymers a potential competitor superior to dendrimers in certain applications. Hyperbranched polymers, and particularly hyperbranched polymers prepared with acrylates, may be used in a variety of applications, for example, ingredients in paints, coatings, textiles, adhesives, superabsorbent materials, contact lenses, display devices, polyelectrolytes & hydrogels. Hyperbranched polymers have reactive end groups that can be modified and used advantageously in coating and additive applications. However, the ability to further tune the properties of hyperbranched polymers through the inclusion of additional functional groups is desired.

SUMMARY OF THE INVENTION

In a first embodiment, a method of preparing a functionalized a polymer is provided comprising supplying a polyester with α-halogenated groups and a carboxylic acid chain end; converting the carboxylic acid chain end of the polyester to an acyl chain end to prepare a polyester with α-halogenated groups and an acyl chain end; and functionalizing at least one of the α-halogenated groups.

In a second embodiment, a method as in the first embodiment is provided, where the acyl chain end is defined by the formula:

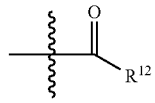

where R12 is an organic group.

In a third embodiment, a method as in either the first or second embodiments is provided, where the conversion of the carboxylic acid chain end of the polyester to an acyl chain end is performed by first reacting the carboxylic acid chain end with N,N-dimethylchlorosulfitemethaniminium chloride to form an aprotic functional group and then replacing the aprotic functional group with a nucleophile.

In a fourth embodiment, a method as in any of the first through third embodiments is provided, where the nucleophile is supplied by adding a compound selected from sodium azide, sodium cyanide, and sodium thiocyanide.

In a fifth embodiment, a method as in any of the first through fourth embodiments is provided is provided, where the polyester is defined by formula II:

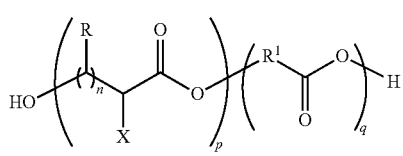

where each R is individually a hydrocarbon group or a hydrogen atom, each n individually 1 to 12, each X is individually a halogen atom, each $R^1$ is individually a divalent organic group, p is from about 1 to about 200, and q is from about to about 200, or formula IV:

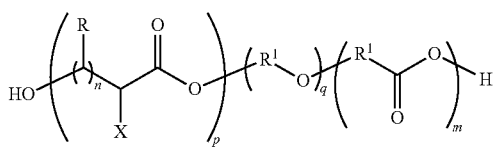

where each R is individually a hydrocarbon group or a hydrogen atom, each n individually 1 to 12, each X is individually a halogen atom, each $R^1$ is individually a divalent organic group, p is from about 1 to about 200, q is from about 1 to about 200, and m is from about 1 to about 200.

In a sixth embodiment is provided, a method of preparing a coupled polymer comprising mixing a plurality of polyesters with α-halogenated groups and a carboxylic acid chain end with N,N-dimethylchlorosulfitemethaniminium chloride.

In a seventh embodiment, a method as in the sixth embodiment is provided, where the polyesters with α-halogenated groups and a carboxylic acid chain end and the N,N-dimethylchlorosulfitemethaniminium chloride are mixed for about 10 to about 20 minutes at about 0° C.

In an eighth embodiment, a method as in either the sixth or seventh embodiments is provided, where the plurality of polyesters with α-halogenated groups and a carboxylic acid chain end has an average molecular weight (Mn) prior to the step of mixing with N,N-dimethylchlorosulfitemethaniminium chloride, and the average molecular weight is double after the step of mixing with N,N-dimethylchlorosulfitemethaniminium chloride.

In a ninth embodiment, a method of crosslinking an α-halogenated polymer is provided comprising inducing the formulation of a dioxolenium ion intermediate in an α-halogenated polymer that includes a unit defined by the formula

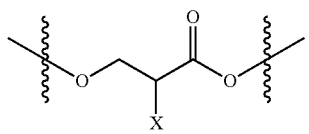

where X is a halogen atom, and reacting the dioxolenium ion intermediate with an activated aromatic ring or an activated polyaromatic compound.

In a tenth embodiment, a method as in the ninth embodiment is provided, where the α-halogenated polymer is an α-halogenated polyester.

In an eleventh embodiment, a method as in either the ninth or tenth embodiments is provided, where the α-halogenated polymer is a hyperbranched α-halogenated polymer.

In a twelfth embodiment, a method as in any of the ninth through eleventh embodiments is provided, where the step of inducing the formulation of a dioxolenium ion intermediate is performed by in the presence of a silver salt.

In a thirteenth embodiment, a method as in any of the ninth through twelfth embodiments is provided, where the step of inducing the formulation of a dioxolenium ion intermediate is performed by heating the α-halogenated polymer.

In a fourteenth embodiment, a method as in any of the ninth through thirteenth embodiments is provided, where the α-halogenated polymer is heated to a temperature of about 95° C. to about 140° C.

In a fifteenth embodiment, a method as in any of the ninth through fourteenth embodiments is provided, where the α-halogenated polymer is heated to a temperature of about 105° C. to about 130° C.

In a sixteenth embodiment, a method as in any of the ninth through fifteenth embodiments is provided, where the dioxolenium ion intermediate is reacted with an activated polyaromatic compound and the activated polyaromatic compound is defined by the formula

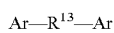

where each Ar is individually an aromatic group and $R^{13}$ is an electron-donating organic group.

In a seventeenth embodiment, a method as in any of the ninth through sixteenth embodiments is provided, where the activated polyaromatic compound is defined by the formula

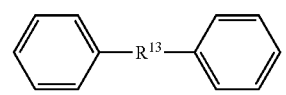

where $R^{13}$ is an electron-donating organic group.

In an eighteenth embodiment, a method as in any of the ninth through seventeenth embodiments is provided, where the crosslinker that has two activated aromatic rings is defined by the formula

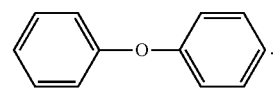 [SMILES: c1ccc(Oc2ccccc2)cc1]

In a nineteenth embodiment, a method of functionalizing an α-halogenated polymer is provided comprising inducing the formulation of a dioxolenium ion intermediate in an α-halogenated polymer that includes a unit defined by the formula

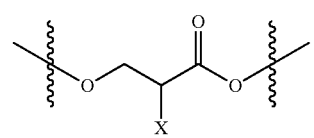

where X is a halogen, and reacting the dioxolenium ion intermediate with an activated aromatic ring.

In a twentieth embodiment, a method as in the nineteenth embodiment is provided, where the α-halogenated polymer is an α-halogenated polyester.

In a twenty-first embodiment, a method as in either the nineteenth or twentieth embodiments is provided, where the α-halogenated polymer is a hyperbranched α-halogenated polymer.

In a twenty-second embodiment, a method as in any of the nineteenth through twenty-first embodiments is provided, where the step of inducing the formulation of a dioxolenium ion intermediate is performed by in the presence of a silver salt.

In a twenty-third embodiment, a method as in any of the nineteenth through twenty-second embodiments is provided, where the step of inducing the formulation of a dioxolenium ion intermediate is performed by heating the α-halogenated polymer.

In a twenty-fourth embodiment, a method as in any of the nineteenth through twenty-third embodiments is provided, where the α-halogenated polymer is heated to a temperature of about 95° C. to about 140° C.

In a twenty-fifth embodiment, a method as in any of the nineteenth through twenty-fourth embodiments is provided, where the α-halogenated polymer is heated to a temperature of about 105° C. to about 130° C.

In a twenty-sixth embodiment, a method as in any of the nineteenth through twenty-fifth embodiments is provided, where the activated aromatic ring is defined by the formula

where Ar is an aromatic group and $R^{14}$ is an electron-donating organic group.

In a twenty-seventh embodiment, a method as in any of the nineteenth through twenty-sixth embodiments is provided, where the activated aromatic ring is defined by the formula

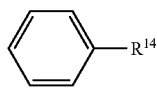

where $R^{14}$ is an electron-donating organic group.

In a twenty-eighth embodiment, a method of preparing an α-halogenated polymer with a polymeric or oligomeric side-chain is provided comprising supplying monomer; initiating the monomer by producing a dioxolenium ion intermediate in an α-halogenated polymer that includes a unit defined by the formula

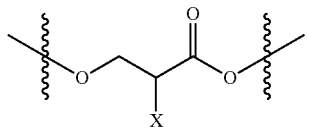

where X is a halogen atom.

In a twenty-ninth embodiment, a method as in the twenty-eighth embodiment, where the α-halogenated polymer is an α-halogenated polyester.

In a thirtieth embodiment, a method as in either the twenty-eighth or twenty-ninth embodiments is provided, where the α-halogenated polymer is a hyperbranched α-halogenated polymer.

In a thirty-first embodiment, a method as in any of the twenty-eighth through thirtieth embodiments is provided, where the step of inducing the formulation of a dioxolenium ion intermediate is performed by in the presence of a silver salt, and the polymerization of the monomer is initiated through cationic initiation.

In a thirty-second embodiment, a method as in any of the twenty-eighth through thirty-first embodiments is provided, where the step of inducing the formulation of a dioxolenium ion intermediate is performed by heating the α-halogenated polymer, and the polymerization of the monomer is initiated through cationic initiation.

In a thirty-third embodiment, a method as in any of the twenty-eighth through thirty-second embodiments is provided, where the α-halogenated polymer is heated to a temperature of about 95° C. to about 140° C.

In a thirty-fourth embodiment, a method as in any of the twenty-eighth through thirty-third embodiments is provided, where the α-halogenated polymer is heated to a temperature of about 105° C. to about 130° C.

In a thirty-fifth embodiment, a method as in any of the twenty-eighth through thirty-fourth embodiments is provided, where the monomer is ethene, a vinyl group containing monomer or a heterocyclic monomer.

In a thirty-sixth embodiment, a method as in any of the twenty-eighth through thirty-fifth embodiments, where the monomer is a heterocyclic monomer selected from cyclic ethers, lactones, lactams, cyclic amines, and combinations thereof.

In a thirty-seventh embodiment, a method of preparing a functionalized a polymer comprising reacting TEMPO compound and an α-halogenated polymer that includes a unit defined by the formula

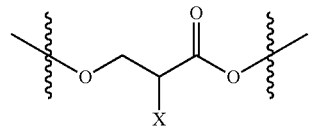

where X is a halogen atom.

In a thirty-eighth embodiment, a method as in the thirty-seventh embodiment, where the TEMPO compound is defined by the formula

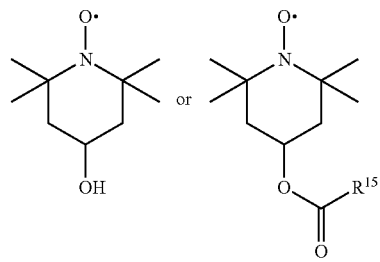

where $R^{15}$ is a monovalent organic group.

In a thirty-ninth embodiment, a method as in either the thirty-seventh or thirty-eighth embodiments, where $R^{15}$ is an active drug ingredient.

DETAILED DESCRIPTION OF ILLUSTRATIVE EMBODIMENTS

One or more embodiments are directed to α-halogenated hydroxy acid-based polymers. For the purpose of this specification, α-halogenated hydroxy acid-based polymers may be referred to as α-halogenated polymers. Advantageously, it has been found that the halogen atom in the α-halogenated polymers allows for further reactions. The halogen atom of an α-halogenated polymer may be used for further reactions, such as functionalization or the initiation site for further polymerization.

The term α-halogenated or α-halo refers to the location of the halogen atom with reference to the carbonyl carbon in the α-halogenated hydroxy acid or α-halogenated hydroxy acid-based polymer. The α location is the carbon atom adjacent to the carbonyl carbon. Accordingly, an α-halogenated hydroxy acid or α-halogenated hydroxy acid-based polymer has a halogen atom attached to the carbon adjacent to the carbonyl carbon. In one or more embodiments, an α-halogenated polymer includes the following unit

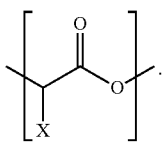

where X is a halogen atom. Examples of suitable halogen atoms include chlorine, bromine, and iodine.

In one or more embodiments, α-halogenated polymers may be prepared with an α-halogenated hydroxy acid or a monomer derived from an α-halogenated hydroxy acid. In one or more embodiments, an α-halogenated hydroxy acid monomer may be defined by the formula I:

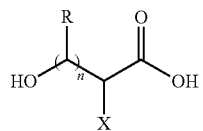

where each R is individually a hydrocarbon group or a hydrogen atom, n is 1 to 12, and X is a halogen atom.

In one or more embodiments, an α-halogenated hydroxy acid monomer may be prepared from a corresponding α-amino hydroxy acid by converting the amine group of an α-amino hydroxy acid, or its derivative, into a halogen by a diazotization reaction in the presence of halogen-containing salt. For example, a 2-halo-3-hydroxypropionic acid may be prepared from serine by reacting serine with an alkali nitrite such as sodium nitrite in the presence of a hydrohalic acid, such as hydrobromic acid, hydroiodic acid, or hydrochloric acid, and a halogen-containing salt, such as, potassium bromide, potassium iodide, or potassium chloride.

In one or more embodiments, hydrocarbon groups suitable for use in an α-halogenated hydroxy acid monomer include linear, branched, or cyclic alkyl groups. Hydrocarbon groups may also include unsaturated organic groups composed of hydrogen and carbon atoms. Suitable unsaturated hydrocarbon groups may include aryl groups. The hydrocarbon groups may be defined by the number of carbon atoms. In certain embodiments, the hydrocarbon group has from about 1 to about 12 carbon atoms.

Based upon the selection of the α-halogenated hydroxy acid or monomer derived from an α-halogenated hydroxy acid, various polymers may be prepared. Specific examples of α-halogenated polymers include polyesters and hyperbranched polyacrylates.

Polyesters

For the purpose of this specification, polyesters that are α-halogenated polymers may be referred to as α-halogenated polyesters. In one or more embodiments, α-halogenated polyesters may be prepared by reacting an α-halogenated hydroxy acid monomer with a hydroxyl acid, a dicarboxylic acid and a diol, or a combination thereof. In other embodiments, an α-halogenated polyester may be prepared as a homopolymer by polymerizing an α-halogenated hydroxy acid. Examples of α-halogenated polyesters and their preparation may be found in U.S. Pat. Pub. No. 2013/0184429, which is incorporated herein by reference.

As used herein, the term "derived from" may be used to describe the portion of a polymer (i.e. mer unit) that results from the polymerization of a monomer. For example, the resulting polymer prepared from an α-halogenated hydroxy acid monomer may be described as including a unit derived from an α-halogenated hydroxy acid monomer. In one or more embodiments, the α-halogenated polyester may be characterized by the amount of units derived from an α-halogenated hydroxy acid monomer. In these or other embodiments, the amount of units derived from an α-halogenated hydroxy acid monomer in the α-halogenated polyester may be described by molar percent (i.e. the percent units derived from an α-halogenated hydroxy acid monomer among all of the units), and determined by $^1$H spectroscopy. In one or more embodiments, the α-halogenated polyester is characterized by an α-halogenated hydroxy acid derived unit content that is at least 5%, in other embodiments at least 15%, and in other embodiments at least 30%. In these or other embodiments, the α-halogenated polyester is characterized by an α-halogenated hydroxy acid derived unit content that is at most 75%, in other embodiments at most 60%, and in other embodiments at most 100%. In certain embodiments the α-halogenated polyester may be characterized by an α-halogenated hydroxy acid derived unit content that is from about 5% to about 100%, in other embodiments from about 15% to about 75%, and in other embodiments from about 30% to about 60%.

Suitable α-halogenated hydroxy acid monomers include those compounds defined by formula I. Examples of α-halogenated hydroxy acid monomers include, but are not limited to α-halogenated hydroxypropionic acid, α-halogenated hydroxybutyric acid, α-halogenated hydroxypentanoic acid, α-halogenated hydroxyhexanoic acid, α-halogenated hydroxyheptanoic acid, α-halogenated hydroxyoctanoic acid, α-halogenated hydroxynonanoic acid, α-halogenated hydroxydecanoic acid, α-halogenated hydroxyundecanoic acid, α-halogenated hydroxydodecanoic acid, α-halogenated hydroxytridecanoic acid, α-halogenated hydroxytetradecanoic acid, and α-halogenated hydroxypentadecanoic acid.

In one or more embodiments, the α-halogenated hydroxy acid monomer may be an α-halogenated 3-hydroxypropionic acid. In these or other embodiments, the α-halogenated hydroxy acid monomer may be defined by the formula

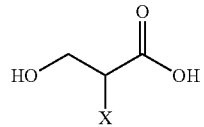

where X is a halogen atom. Specific examples of α-halogenated 3-hydroxypropionic acid include

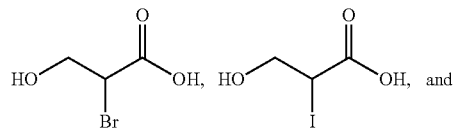

-continued

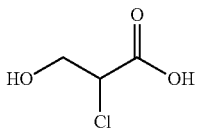

As noted above, an α-halogenated polyester may be prepared by reacting an α-halogenated hydroxy acid monomer with a hydroxy acid, a dicarboxylic acid and a diol, or a combination thereof. Suitable diols include those compounds defined by the formula

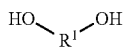

where $R^1$ is a divalent organic group. Specific examples of diols include, but are not limited to, 1,6-hexane diol and 1,4-benzene diol (hydroquinone).

In certain embodiments, the diol may be poly(ethylene glycol), which may also be referred to as PEG. Those skilled in the art will recognize that PEG may be defined by the formula

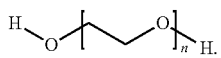

Suitable values for n for use as a diol for preparing an α-halogenated polyester are from about 1 to about 4, in other embodiments from about 5 to about 46 and in other embodiments from about 7 to about 15.

Suitable diacids include those compounds defined by the formula

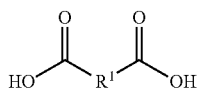

where $R^1$ is a divalent organic group. Specific examples of diacids include, but are not limited to, isophthalic acid, adipic acid, and malonic acid.

Suitable hydroxy acids include those compounds defined by the formula

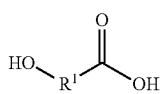

where $R^1$ is a divalent organic group.

In one or more embodiments, divalent organic groups include linear, branched, or cyclic alkyl divalent hydrocarbons. The hydrocarbon groups may be saturated or unsaturated. Suitable unsaturated hydrocarbon groups may include aryl groups. In certain embodiments, the organic group may contain a heteroatom. Suitable heteroatoms include halogen, nitrogen, oxygen, and sulfur. The divalent organic groups may be defined by the number of carbon atoms. In one or more embodiments, the divalent organic groups may have from about 1 to about 12 carbon atoms.

Specific examples of hydroxy acids include, but are not limited to, lactic acid, glycolic acid, 6-hydroxyhexanoic acid, and salicylic acid.

Lactic acid is a particularly useful hydroxy acid for preparing α-halogenated polyesters. Polyesters of poly(lactic acid) have found use in biodegradable commercial products such as dairy containers, food trays, cold drink cups, products for packaging applications, bottles for fruit juices, sport drinks and jams and jellies. Polyesters of poly(lactic acid) have also found use as biomedical soft materials in drug and gene delivery, sutures, stents, dental implants and as tissue engineering scaffolding.

In one or more embodiments, where the α-halogenated polyester includes unites derived from lactic acid, the α-halogenated polyester may be characterized by the amount of units derived from lactic acid in the α-halogenated polyester. In these or other embodiments, the amount of units derived from lactic acid in the α-halogenated polyester may be described by molar percent and determined by $^1H$ spectroscopy. In one or more embodiments, the α-halogenated polyester is characterized by a lactic acid content that is at least 5%, in other embodiments at least 15%, and in other embodiments at least 30%. In these or other embodiments, the α-halogenated polyester is characterized by a lactic acid content that is at most 75%, in other embodiments at most 60%, and in other embodiments at most 99%. In certain embodiments the α-halogenated polyester may be characterized by a lactic acid content that is from about 5% to about 99%, in other embodiments from about 15% to about 75%, and in other embodiments from about 30% to about 60%.

Lactic acid is a chiral molecule with two isomers. The (L) isomer rotates light clockwise while the (D) isomer rotates light counterclockwise. Naturally produced Lactic Acid is available in the (L) isomer. Lactic acid prepared synthetically, such as from petroleum, produces a racemic mixture of the two isomers. In one or more embodiments, where the α-halogenated polyester includes units derived from lactic acid the α-halogenated polyester may be characterized by the percentage of (L) isomer lactic acid out of the total amount of units derived from lactic acid in the α-halogenated polyester. In these or other embodiments, the percentage of (L) isomer lactic acid out of the total amount of units derived from lactic acid in the α-halogenated polyester may be described by molar percent and determined by $^1H$ spectroscopy. In certain embodiments, the (L) isomer lactic acid content is about 100%. In certain embodiments, the α-halogenated polyester is (L) isomer lactic acid free [i.e. 100% (D) isomer lactic acid] or substantially (L) isomer lactic acid free. In other embodiments, the (L) isomer lactic acid content and (D) isomer lactic acid content is a racemic mixture of the two isomers or close to racemic mixture (i.e. within about 5%). In one or more embodiments, the α-halogenated polyester is characterized by an (L) isomer lactic acid content that is at least 1%, in other embodiments at least 25%, and in other embodiments at least 40%. In these or other embodiments, the α-halogenated polyester is characterized by an (L) isomer lactic acid content that is at most 90%, in other embodiments at most 80%, and in other embodiments at most 70%. In certain embodiments the α-halogenated polyester may be characterized by an (L) isomer lactic acid content that is from about 1% to about 90%, in other embodiments from about 25% to about 80%, and in other embodiments from about 40% to about 70%.

In one or more embodiments, the α-halogenated polyester may be prepared through a condensation reaction. In one or more embodiments, the α-halogenated polyester may be self-condensation of an α-halogenated hydroxy acid monomer. In other embodiments, the α-halogenated polyester may be condensation of an α-halogenated hydroxy acid monomer and one or more hydroxy acids. In other embodiments, the α-halogenated polyester may be condensation of an α-halogenated hydroxy acid monomer, one or more diols, and one or more diacids. In still other embodiments, the α-halogenated polyester may be condensation of an α-halogenated hydroxy acid monomer, one or more hydroxy acids, one or more diols, and one or more diacids.

In one or more embodiments, where an α-halogenated polyester is prepared with a α-halogenated hydroxy acid monomer and a diacid, the α-halogenated polyester may be defined by the formula II:

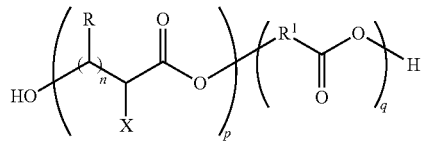

where each R is individually a hydrocarbon group or a hydrogen atom, each n is individually from about 1 to about 12, each X is individually a halogen atom, each $R^1$ is individually a divalent organic group, p is from about 1 to about 200, q is from about 1 to about 200.

In one or more embodiments, where the α-halogenated polyester of formula II is prepared by the reaction of an α-halogenated 3-hydroxypropionic acid and a hydroxy acid, the α-halogenated polyester may be defined by the formula III:

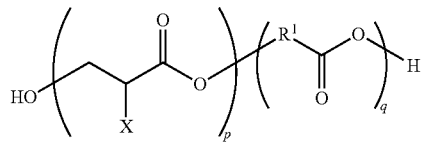

where each X is individually a halogen atom, each $R^1$ is individually a divalent organic group, p is from about 1 to about 200, and q is from about 1 to about 200.

In one or more embodiments, where an α-halogenated polyester is prepared by the reaction of an α-halogenated hydroxy acid monomer, a diol and a diacid, the α-halogenated polyester may be defined by the formula IV:

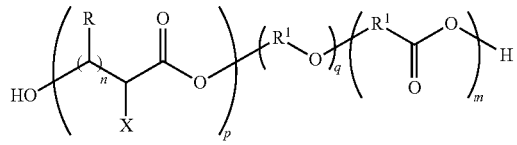

where each R is individually a hydrocarbon group or a hydrogen atom, each n is individually from about 1 to about 12, each X is individually a halogen atom, each $R^1$ is individually a divalent organic group, p is from about 1 to about 200, q is from about 1 to about 200, and m is from about 1 to about 200.

In one or more embodiments, where the α-halogenated polyester of formula IV is prepared by the reaction of an α-halogenated 3-hydroxypropionic acid, a diol and a diacid, the α-halogenated polyester may be defined by the formula V:

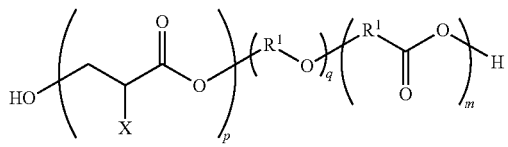

where each X is individually a halogen atom, each $R^1$ is individually a divalent organic group, p is from about 1 to about 200, q is from about 1 to about 200, and m is from about 1 to about 200.

As noted above, the α-halogen of the α-halogenated polyester advantageously allows for post-polymerization functionalization of the polymer. The post polymerization functionalization may take place, for example, by nucleophilic substitution, radical addition, radical-radical coupling and/or electrophilic substitution. The α-halogen activated to nucleophilic attack by three mechanisms: inductive electron withdrawal by the adjacent carbonyl, reduced steric bulk at the σ* orbital of the carbon-halogen bond due to the adjacent carbonyl and through-space electron donation from the σ-orbital of the carbon-halogen bond to the π* orbital of the carbonyl. Because of this activation, α-halo esters undergo nucleophilic substitution by a number of hard (e.g. alcohol, alkoxide, carboxylate and primary amine), soft (e.g. cyanide, iodide, thio and thioalkoxide) and borderline hard/soft nucleophiles (e.g. azide, nitroxide and pyridine) under mild conditions.

It has been found that post-polymerization functionalization of α-halogenated polyesters may result in a reduced averaged molecule of the polymer (Mn). Without wishing to be bound to any particular mechanism of action, it is believed that the acidic end group of the α-halogenated polyester is responsible for cleaving the polymer during the post-polymerization functionalization. It has been found that replacing the carboxylic acid chain end of the α-halogenated polyester with an acyl group allows for post-polymerization functionalization of α-halogenated polyester without a reduction in molecular weight. In these or other embodiments, post-polymerization functionalization of α-halogenated may be performed by supplying a polyester with α-halogenated groups and a carboxylic acid chain end; converting the carboxylic acid chain end of the polyester to an acyl chain end to prepare a polyester with α-halogenated groups and an acyl chain end; and functionalizing at least one of the α-halogenated groups.

In one or more embodiments, the conversion of the carboxylic acid chain end of the polyester to an acyl chain end is performed by first reacting the carboxylic acid chain end with N,N-dimethylchlorosulfitemethaniminium chloride. This reaction converts the acid to a new functional group that is aprotic. The aprotic functional group may then be reacted with a nucleophile. The reaction of the aprotic functional group and the nucleophile will replace the aprotic functional group with the nucleophile, regenerate DMF, and evolve $SO_2$. Suitable nucleophiles include soft nucleophiles such as thiols, thiocyanates, cyanide, or borderline soft nucleophiles such as azide, nitroxide, aromatic amines. Specific examples of compounds that may be added to provide a nucleophile include sodium azide, sodium cyanide, and sodium thiocyanide.

Scheme 1 provides a general reaction scheme of one or more embodiments for the conversion of the carboxylic acid chain end of the polyester to an acyl chain end.

Scheme 1

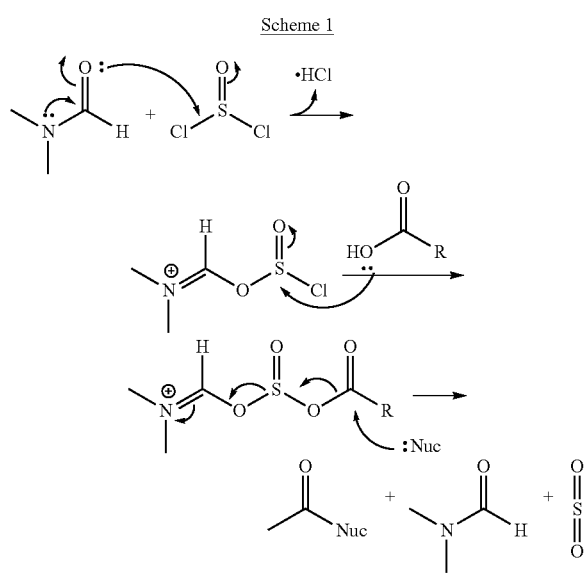

In these or other embodiments, the resultant acyl chain end may be defined by the formula:

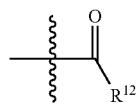

where $R^{12}$ is an organic group. Specific examples of suitable organic groups for the acyl chain ends may be those groups that result from soft nucleophiles such as thiols, thiocyanates, cyanide, or borderline soft nucleophiles such as azide, nitroxide, aromatic amines.

As noted above, the α-halogenated polyester may be functionalized after the conversion of the carboxylic acid chain end of the polyester to an acyl chain end. In one or more embodiments, the α-halogen groups of the α-halogenated polyester with an acyl chain end is functionalized with a nucleophile.

It has also been found that the DMF/SOCl$_2$ adduct may be used to couple α-halogenated polyesters. In these or other embodiments, α-halogenated polyesters are combined with N,N-dimethylchlorosulfitemethaniminium chloride. Without wishing to be bound to any particular mechanism of action, it is believed that the nucleophilic alcohol first reacts with the DMF/SOCl$_2$ adduct. The carboxylic acid then reacts at the methylene adjacent to the alcohol to couple the chains. In one or more embodiments, the average molecular weight of the coupled α-halogenated polyester is about twice the average molecular weight of the uncoupled α-halogenated polyester. In one or more embodiments, the coupling couple α-halogenated polyesters may be performed in dry conditions under nitrogen at about 0° C.

Scheme 2 provides a general reaction scheme of one or more embodiments for the coupling of α-halogenated polyesters.

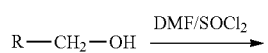

-continued

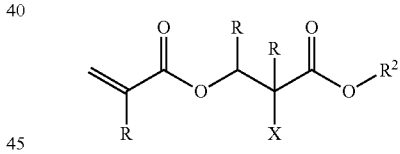

In scheme 2, R is the chain of a first α-halogenated polyester and R$_1$ is the chain of a second α-halogenated polyester.

Branched Polymers

As noted above, hyperbranched α-halogenated polymers may be prepared from monomers derived from an α-halogenated hydroxy acid. In one or more embodiments, the hyperbranched α-halogenated polymers may be hyperbranched polyacrylates prepared from α-halogenated acrylate-based inimers. Hyperbranched polymers are characterized by random and non-uniform branching, as opposed to dendrimers, which have uniform distribution of branches in three dimensions. The α-halogenated acrylate-based inimers, which may simply be referred to as the inimers, contain an initiating site and polymerizable group in the same molecule. The α-halogen of the α-halogenated acrylate-based inimer functions as an initiation site, and the acrylate functions as a polymerizable group. Examples of a hyperbranched polyacrylates prepared from α-halogenated acrylate-based inimers may be found in U.S. Pat. Pub. No. 2011/0046334 and U.S. Pat. Pub. No. 2013/0090442, which are both incorporated herein by reference.

In one or more embodiments, the inimer may be defined by formula VI:

where each R is individually a hydrocarbon group or a hydrogen atom, n is 1 to 12, X is a halogen atom, and R$^2$ is a monovalent organic group or a siloxane group. While the term α-halogenated acrylate-based inimers has been used to refer to the inimers, the inimer may include either an acrylate group or an alkyl acrylate group. In one or more embodiments, where the R group adjacent carbon-carbon double bond is a hydrogen atom the inimer may include an acrylate group. In other embodiments, where the R group is adjacent carbon-carbon double bond is an alkyl group the inimer may include an alkyl acrylate group. In these or other embodiments, the inimer may include a methacrylate group.

In one or more embodiments, monovalent organic groups include linear, branched, or cyclic alkyl monovalent hydrocarbons. The hydrocarbon groups may be saturated or unsaturated. Suitable unsaturated hydrocarbon groups may include aryl groups. In certain embodiments, the organic group may contain a heteroatom. Suitable heteroatoms include halogens, nitrogen, oxygen, sulfur, and silicon. The monovalent organic groups may be defined by the number of carbon atoms. In one or more embodiments, the divalent organic groups may have from about 1 to about 12 carbon atoms.

As noted above, the $R^2$ group may be a monovalent organic group or a siloxane group. An exemplary organic groups that may be an $R^2$ group include hydrocarbons oligooxyethylene, mesogenic, and fluorocarbon groups. Specific examples of suitable $R^2$ include, but are not limited to methyl, ethyl, and n-propyl groups.

Inimers may be prepared from α-halogenated hydroxy acid monomer. In one or more embodiments, an inimer may be prepared through the esterification of the carboxylic acid group of the α-halogenated hydroxy acid monomer and then adding a vinyl group through the esterification of the alcohol. For example, a classic Fischer esterification may be used to prepare an ester from the carboxylic acid group and then an acryloyl halide or an acrlylic anhydride may be used in the esterification of the alcohol.

In one or more embodiments, where the inimer is prepared using an α-halogenated 3-hydroxypropionic acid, the inimer may be defined by formula VII:

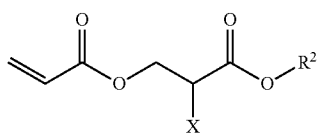

where X is a halogen atom and $R^2$ is a monovalent organic group.

Specific examples of inimers derived from 3-hydroxypropionic acid include (2-bromo-2-methoxycarbonyl)ethyl acrylate, (2-bromo-2-ethoxycarbonyl)ethyl acrylate, (2-bromo-2-n-propoxycarbonyl)ethyl acrylate, (2-chloro-2-methoxycarbonyl)ethyl acrylate, (2-chloro-2-ethoxycarbonyl)ethyl acrylate, (2-chloro-2-n-propoxycarbonyl)ethyl acrylate, (2-bromo-2-methoxycarbonyl)ethyl methacrylate, (2-bromo-2-ethoxycarbonyl)ethyl methacrylate, (2-bromo-2-n-propoxycarbonyl)ethyl methacrylate, (2-chloro-2-methoxycarbonyl)ethyl methacrylate, (2-chloro-2-ethoxycarbonyl)ethyl methacrylate, and (2-chloro-2-n-propoxycarbonyl)ethyl methacrylate.

Hyperbranched α-halogenated polymers may be prepared from inimers and optionally co-monomer. Suitable co-monomers include radically polymerizable monomers. Examples of suitable co-monomers include, but are not limited to, ethylene, dienes, styrenes, methyl styrenes, acrylates, acrylamides, methacrylamides, acrylonitrile, methacrylates, vinyl acetates, and vinyl alcohols and mixtures thereof.

In one or more embodiments, where the hyperbranched α-halogenated polymer includes units derived from a co-monomer, the hyperbranched α-halogenated polymer may be characterized by the amount of units derived from the inimer in the hyperbranched α-halogenated polymer. In these or other embodiments, the amount of units derived from inimer in the hyperbranched α-halogenated polymer may be described by molar percent and determined by $^1$H spectroscopy. In one or more embodiments, the hyperbranched α-halogenated polymer is characterized by an inimer content that is at least 1%, in other embodiments at least 15%, and in other embodiments at least 25%. In these or other embodiments, the hyperbranched α-halogenated polymer is characterized by an inimer content that is at most 99%, in other embodiments at most 90%, and in other embodiments at most 80%. In certain embodiments, the hyperbranched α-halogenated polymer is characterized by an inimer content that is from about 1% to about 99%, in other embodiments from about 15% to about 90%, and in other embodiments from about 25% to about 80%.

In one or more embodiments, a hyperbranched α-halogenated polymer may be prepared through the self-condensing vinyl polymerization of an inimer or the self-condensing vinyl copolymerization of an inimer and a co-monomer The self-condensing vinyl polymerization of the inimer may be described as an AB* polymerization, where B* is a group capable of initiating the polymerization of a vinyl group and A is a vinyl group. The chain initiation is the addition of an initiating B* group to the vinyl group of another monomer forming a dinner with two active sites and one double bond. Both the initiating center, B*, and the newly created propagating center, A*, can react with the vinyl group of another molecule (monomer or polymer) in the same way with rate constants, $k_b$ and $k_a$, respectively. Scheme 3 depicts an example of possible inimer propagation.

Scheme 3

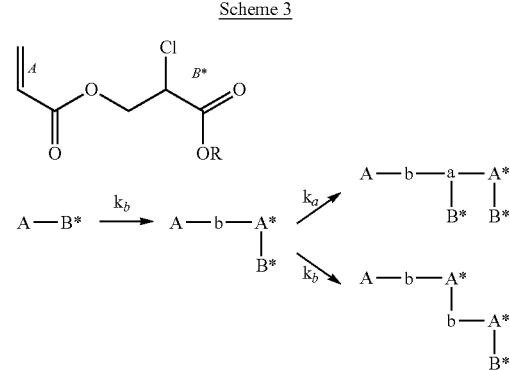

Advantageously, it has been found that an α-halogenated polymer may be induced to produce a dioxolenium ion intermediate, which allows for further reactivity. The dioxolenium ion intermediate may be used in a reaction to functionalize, crosslink, or initiate a pendent oligomer or polymer chain on an α-halogenated polymer. In one or more embodiments, a dioxolenium ion intermediate may be formed by an ester groups and the α-halogen of the α-halogenated polymer. The groups on the α-halogenated polymer capable of forming a dioxolenium ion intermediate may be referred to as a dioxolenium ion forming unit. Suitable α-halogenated polymers with a dioxolenium ion forming unit include α-halogenated polyester that include units derived from an α-halogenated 3-hydroxypropionic acid and hyperbranched α-halogenated polymers that include units derived from inimers derived from 3-hydroxypropionic acid. In one or more embodiments, α-halogenated polymer capable of forming a dioxolenium ion intermediate include those α-halogenated polymers that includes an α-halogenated unit defined by the formula

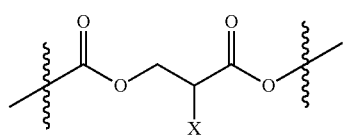

where X is a halogen atom. In these or other embodiments, the dioxolenium ion intermediate may be defined by the following formula

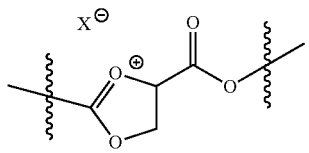

where X is a halogen atom. The dioxolenium ion intermediate may reversibly return to the α-halogenated unit or rearrange to a unit defined by the formula

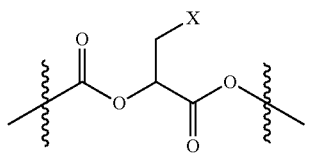

where X is a halogen atom. The rearranged unit may reversibly return to the dioxolenium ion intermediate.

The conversion of a dioxolenium ion forming unit to a dioxolenium ion intermediate may be induced through heat or chemically. In one or more embodiments, a dioxolenium ion intermediate may be produced on an α-halogenated polymer by heating the α-halogenated polymer. In one or more embodiments, the temperature of the α-halogenated polymer may be measured at the external apparatus or bath used to heat the reaction mixture. For example, if an oil bath is used to heat the α-halogenated polymer, the temperature may be measured in the oil bath. In one or more embodiments, the α-halogenated polymer is heated to a temperature greater than 95° C., in other embodiments greater than 100° C., and in still other embodiment greater than 105° C. In one or more embodiments, the α-halogenated polymer is heated to a temperature less than 140° C., in other embodiments less than 130° C., and in still other embodiment less than 115° C. In these or other embodiments, the α-halogenated polymer is heated to a temperature from about 95° C. to about 140° C., in other embodiments to a temperature from about 100° C. to about 130° C., and in still other embodiment to a temperature from about 105° C. to about 115° C.

In one or more embodiments, where the conversion of a dioxolenium ion forming unit to a dioxolenium ion intermediate is induced by heating the α-halogenated polymer, the α-halogenated polymer (and any other reactants that may form a reaction mixture) may be heated for at least 24 hours, in other embodiments at least 48 hours, and in other embodiments, at least 72 hours. In one or more embodiments, the α-halogenated polymer may be heated for at most 336 hours, in other embodiments at most 240 hours, and in other embodiments at most 168 hours. In one or more embodiments, the α-halogenated polymer may be heated for about 24 hours to about 336 hours, in other embodiments for about 48 hours to about 240 hours, and in other embodiments for about 72 hours to about 168 hours.

In one or more embodiments, a dioxolenium ion intermediate may be produced on an α-halogenated polymer by contacting the α-halogenated polymer with a silver salt in the presence of a non-nucleophilic counter ion. In these or other embodiments, the α-halogenated polymer, silver salt, and non-nucleophilic counter ion may be combined in a solvent and stirred. In these or other embodiments, the α-halogenated polymer is heated to a temperature from about 15° C. to about 30° C., in other embodiments to a temperature from about 17° C. to about 27° C., and in still other embodiment to a temperature from about 20° C. to about 25° C. Suitable silver salts include, those with non-nucleophilic counter ions. Suitable non-nucleophilic counter ions include, but are not limited to triflate, perfluoroate, PF6, tetrafluorborate, and hexafluroantimonate, hexafluoroarsenate.

In one or more embodiments, where the conversion of a dioxolenium ion forming unit to a dioxolenium ion intermediate is induced by chemically with silver salts the α-halogenated polymer, the α-halogenated polymer (and any other reactants that may form a reaction mixture) may be heated for at least 5 minutes, in other embodiments at least 30 minutes, and in other embodiments at least 1 hour. In one or more embodiments, the α-halogenated polymer may be heated for at most 24 hours, in other embodiments at most 12 hours, and in other embodiments at most 6 hours. In one or more embodiments, the α-halogenated polymer may be heated for about 5 minutes to about 24 hours, in other embodiments for about 30 minutes to about 12 hours, and in other embodiments for about 1 hour to about 6 hours.

As noted above, the ability of the α-halogenated polymer to form dioxolenium ion intermediate may be used to functionalize the α-halogenated polymer. Suitable functionalizing agents for functionalizing an α-halogenated polymer through a reaction with a dioxolenium ion intermediate include activated aromatic rings. In these or other embodiments, the α-halogenated polymer may be functionalized by forming a dioxolenium ion intermediate and then reacting the dioxolenium ion intermediate with an activated aromatic ring. In these or other embodiments, an activated aromatic ring may be introduced to the α-halogenated polymer prior to inducing the α-halogenated polymer to form a dioxolenium ion intermediate. In other embodiments, an activated aromatic ring may be introduced to the α-halogenated polymer after inducing the α-halogenated polymer to form a dioxolenium ion intermediate.

Activated aromatic rings include aromatic compounds that include an aromatic ring and an electron-donating group. Suitable aromatic rings include, but are not limited to benzene, napthalene, anthracene, and graphene. Suitable electron donating groups include but are not limited alkoxy, alkyl, alkanoate, heteroatoms, thioalkyl, and amines.

In one or more embodiments, the activated aromatic ring may be defined by the formula

where Ar is an aromatic group and $R^{14}$ is an electron-donating organic group. In these or other embodiments, where the aromatic group is a benzene ring, the activated aromatic ring may be defined by the formula

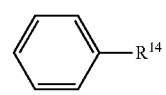

where $R^{14}$ is an electron-donating organic group.

In one or more embodiments, the amount of the activated aromatic ring added to the α-halogenated polymer is characterized by the ratio of the α-halogen to the activated aromatic rings. In one or more embodiments, the ratio of α-halogens to activated aromatic rings added to the α-halogenated polymer is at least 1:0.1, in other embodiments at least 1:0.2, and in other embodiments at least 1:0.5. In these or other embodiments, the amount of activated aromatic ring added to the α-halogenated polymer is at most 1:1.3, in other embodiments at most 1:1.2, and in other embodiments at most 1:1.1. In certain embodiments, the amount of activated aromatic ring added to the α-halogenated polymer is from about 1:0.1 to about 1:1.3, in other embodiments from about 1:0.2 to about 1:1.2, and in other embodiments from about 1:0.5 to about 1:1.1.

As noted above, the ability of the α-halogenated polymer to form dioxolenium ion intermediate may be used to crosslink the α-halogenated polymer. Suitable crosslinking agents for crosslinking an α-halogenated polymer through a reaction with a dioxolenium ion intermediate include activated aromatic rings and activated polyaromatic ring compound. Activated polyaromatic ring compounds include those compounds with more than one aromatic ring and where the aromatic rings joined by an electron-donating organic group. In one or more embodiments, suitable activated aromatic rings for crosslinking an α-halogenated polymer include those activated aromatic rings as described above. In these or other embodiments, a small electron-donating organic group should be selected so that more than one dioxolenium ion intermediate may react on the aromatic ring. In these or other embodiments, the α-halogenated polymer may be crosslinked by forming a dioxolenium ion intermediate and then reacting the dioxolenium ion intermediate with an activated aromatic ring or an activated polyaromatic ring compound. In these or other embodiments, an activated aromatic ring or an activated polyaromatic ring compound may be introduced to the α-halogenated polymer prior to inducing the α-halogenated polymer to form a dioxolenium ion intermediate. In other embodiments, an activated aromatic ring or an activated polyaromatic ring compound may be introduced to the α-halogenated polymer after inducing the α-halogenated polymer to form a dioxolenium ion intermediate.

Suitable aromatic rings for use in an activated polyaromatic ring compound include, but are not limited to benzene, napthalene, anthracene, and graphene. Suitable electron donating groups include but are not limited alkoxy, alkyl, alkanoate, heteroatoms, alkylthio, and amines.

In one or more embodiments, the activated polyaromatic ring compound is defined by the formula Ar—O³—Ar where each Ar is individually an aromatic group and $R^{13}$ is an electron-donating group. In these or other embodiments, where the activated polyaromatic ring compound has two benzene rings, the activated polyaromatic ring compound may defined by the formula

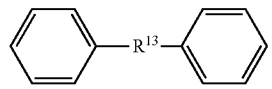

where $R^{13}$ is an electron-donating group. In certain embodiments, where the electron-donating group is an oxygen atom, the activated polyaromatic ring compound may defined by the formula

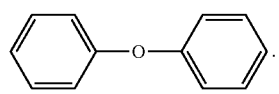 [SMILES: c1ccc(Oc2ccccc2)cc1]

In one or more embodiments, the amount of the activated polyaromatic ring or activated aromatic ring added to the α-halogenated polymer is characterized by the ratio of α-halogens in the α-halogenated polymer to activated polyaromatic ring or activated aromatic ring. In one or more embodiments, the ratio of α-halogens to activated polyaromatic ring or activated aromatic ring added to the α-halogenated polymer is at least 1:0.05, in other embodiments at least 1:0.1, and in other embodiments at least 1:0.25. In these or other embodiments, the amount of activated polyaromatic ring or activated aromatic ring added to the α-halogenated polymer is at most 1:0.6, in other embodiments at most 1:0.5, and in other embodiments at most 1:0.4. In certain embodiments, the amount of activated polyaromatic ring or activated aromatic ring added to the α-halogenated polymer is from about 1:0.05 to about 1:0.6, in other embodiments from about 1:0.1 to about 1:0.5, and in other embodiments from about 1:0.25 to about 1:0.4.

As noted above, the ability of the α-halogenated polymer to form dioxolenium ion intermediate may be used to initiate a polymerization. In these or other embodiments, the dioxolenium ion intermediate will act as a cationic initiator. In one or more embodiments, where the dioxolenium ion intermediate is used to initiate polymerization, the resultant α-halogenated polymer will have a pendent polymer or oligomer. In these or other embodiments, a monomer may be introduced to the α-halogenated polymer prior to inducing the α-halogenated polymer to form a dioxolenium ion intermediate. In other embodiments, a monomer may be introduced to the α-halogenated polymer after inducing the α-halogenated polymer to form a dioxolenium ion intermediate.

Suitable monomers that may initiated using a dioxolenium ion intermediate include, but are not limited to olefins and heterocyclic monomers. Specific examples heterocyclic monomers include, but are not limited to cyclic eithers, lactones, lactams, cyclic amines, oxazolines, oxazines and combinations thereof.

In one or more embodiments, where a dioxolenium ion intermediate has been used to initiate a polymerization on an α-halogenated polymer, the α-halogenated polymer may include a unit define by the formula

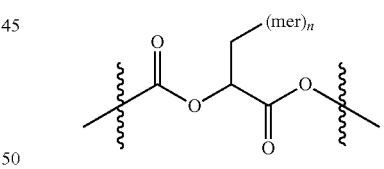

where mer is a unit of a polymer and n is from about 1 to about 200. Suitable mer units include alkyl olefins, 1,3-dienes, styrenes, vinyl ethers, N-Vinyl carbazole, N-vinyl pyrrolidone, aldehydes, and ketones.

In one or more embodiments, the amount of monomer added to the α-halogenated polymer is characterized by characterized by the ratio of α-halogens in the α-halogenated polymer to monomer. In one or more embodiments, the amount of monomer added to the α-halogenated polymer is at least 1:2, in other embodiments at least 1:5, and in other embodiments at least 1:10. In these or other embodiments, the amount of monomer added to the α-halogenated polymer is at most 1:1000, in other embodiments at most 1:200, and in other embodiments at most 1:100. In certain embodiments, the amount of monomer added to the α-halogenated polymer is from about 1:2 to about 1:1000, in other embodiments from about 1:5 to about 1:200, and in other embodiments from about 1:10 to about 1:100.

In one or more embodiments, a functional radical trap may be used in the functionalization of an α-halogenated polymer. In one or more embodiments, a functional radical trap may be used as functionalization agent to functionalize an α-halogenated polymer. In other embodiments, the functional radical trap may trap the radical and allow for another molecule, such as a monomer to functionalize the α-halogenated polymer.

A functional radical trap is a compound that includes a nitroxide radical. In these or other embodiments, a TEMPO compound may be used as a functionalizing agent for functionalizing an α-halogenated polymer. In these or other embodiments, an α-halogenated polymer may be functionalized by reacting α-halogenated polymer with a TEMPO compound. An exemplary functionalization of an α-halogenated polymer using a TEMPO compound includes of the mixing the TEMPO compound and a non-basic ligand in a solvent. Two equivalent of copper for every α-halogen in the α-halogenated polymer is then added to the TEMPO/non-basic ligand mixture. The α-halogenated polymer is added last and the mixture may be stirred at about 90° C. The reaction may be allowed to proceed for about 12 to about 24 hours. Suitable non-basic ligands include bypyridines. A particularly useful bypyridines is 4,4'-diheptybypyridine due to its solubility in organic solvents when complexed to metals.

TEMPO compounds include 2,2,6,6-tetramethylpiperidin-1-oxyl and derivatives thereof. Suitable derivatives of TEMPO compounds include 4-hydroxy-2,2,6,6-tetramethylpiperidin-1-oxyl (hydroxy-TEMPO). The hydroxyl group of hydroxy-TEMPO provides for an excellent location to attach additional functionalities. In one or more embodiments, where the hydroxy-TEMPO compound is a radical, the hydroxy-TEMPO compound may be defined by the formula

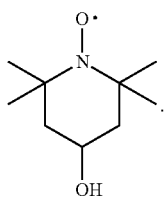

In one or more embodiments, where a TEMPO derivative may be defined by the formula

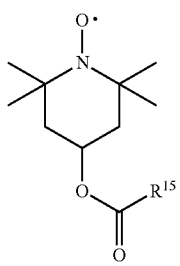

where $R^{15}$ is a monovalent organic group.

Examples of suitable monovalent organic groups include fluorocarbons, and active drug ingredients. Suitable active drug ingredients include nonsteroidal anti-inflammatory drugs (NSAIDs). Specific examples of NSAIDs include, but are not limited to aspirin and ibuprofen.

While particular embodiments of the invention have been disclosed in detail herein, it should be appreciated that the invention is not limited thereto or thereby inasmuch as variations on the invention herein will be readily appreciated by those of ordinary skill in the art. The scope of the invention shall be appreciated from the claims that follow.

EXAMPLES

Synthesis of Poly[(lactic Acid)-co-(3-hydroxy-2-azidopropionic acid)] Starting from the Brominated Copolymer with Thionyl Chloride As an example: thionyl chloride was (0.8 mL, 11.0 mmol) was added to a 25 mL addition funnel containing a solution of DMF (1 mL, 12.8 mmol) in benzene (5 mL). The contents were left to settle for 20 minutes into two phases. The bottom phase was added to a solution of poly[(lactic acid)-co-(2-bromo-3-hydroxypropionic acid)] ($M_{nLS}$=2.34×10$^4$, Đ=1.97; 0.40 g, 1.79 mmol Br) in DMF (2 mL) cooled to 0° C. in an ice bath, and stirred for 5 minutes. Sodium azide (0.18 g, 2.69 mmol) was added all at once and the reaction was stirred for 19 h. DMF was then removed via trap-to-trap distillation and $CH_2Cl_2$ (25 mL) was added. The mixture was passed through celite and the solvent was removed by rotary evaporation. $CH_2Cl_2$ (1 mL) was added and precipitated into MeOH (100 mL) twice to yield 0.14 g (42%) of copolymer as a white solid; $M_{nLS}$=3.39×10$^4$, Đ=1.73. $^1$H NMR: 1.4-1.7 (m, $CH_3$), 4.2-4.4.6 (m, $CH_2CHN_3$), 5.3-5.1 (m, $CHCH_3$). $^{13}$C NMR: 16.6 ($CH_3$), 53.0 ($CHN_3$), 64.9-65.7 ($CH_2$), 69.1-70.1 ($CHCH_3$), 166.8 ($CHN_3CO_2$), 169.3 ($C(CH_3)COO$).

Synthesis of Cross-Linked Poly[(lactic Acid)-co-(2-bromo-3-hydroxypropionic acid)]

A melted solution of D,L-lactic acid (4.5 g, 41 mmol), 2-bromo-3-hydroxypropionic acid (6.9 g, 41 mmol), pTSA.H$_2$O (0.08 g, 4.0 mmol) and diphneyl ether (DPE) (1.0 mL) was stirred mechanically, with a 4 blade glass rod, at 90° C. at atmospheric pressure for 2 h, and at 90° C. under reduced pressure (1-3 mm Hg) for 24 hours before the reaction became a white taffy-like solid.

Kinetics Study of the Polymerization of MMA Initiated from the Brominated Polyester Using HB The graft copolymers were synthesized in 29-39% yield as in the following example. A solution of MMA (2.0 g, 20 mmol) and 4,4'-diheptyl-2,2'-bypryidne (140 mg, 0.40 mmol) in toluene (1.5 mL) in a Schlenk tube sealed with a rubber septum was degassed by three freeze-pump/10 min-thaw cycles. The solution was frozen in liquid N$_2$, and CuCl (20 mg, 0.20 mmol) was added into the Schlenk tube under a positive flow of N$_2$. The contents of the Schlenk tube were again degassed by one freeze-pump/10 min-thaw cycle, and the mixture was stirred for ten min to allow the ligand to complex the catalyst as indicated by a color change from clear to dark red. The contents of the Schlenk tube were frozen, and a solution of poly[(lactic acid)-co-(2-bromo-3-hydroxypropionic acid)] (77:23 LA/Br; GPC$_{PSt}$ $M_n$=1.34×10$^4$, Đ=2.78; GPC$_{LS}$ $M_n$=3.58×10$^4$, Đ=1.64; 0.39 mg, 0.10 mmol Br) in toluene (0.5 mL) was added into the Schlenk tube under a positive flow of N$_2$. After degassing the polymerization mixture by two additional freeze-pump/10 min-thaw cycle, and then backfilling the Schlenk tube with $N_2$, the polymerization mixture was stirred at 90° C. for 66 hours. Aliquots were removed periodically using an $N_2$-purged syringe while the Schlenk tube was under a positive flow of $N_2$. The monomer conversion of each aliquot was determined by $^1H$ NMR spectroscopy by comparing the vinyl resonances of the monomer at 5.62-6.22 ppm and the methylester resonances of the polymer at 3.43-3.72 ppm. The molecular weight distributions of each aliquot were determined by $GPC_{PSt, LS}$. The polymerization was then quenched by immersing the Schlenk tube into liquid $N_2$. The contents of the polymerization tube were thawed, opened to the atmosphere and diluted with THF (5 mL), and then precipitated into methanol (150 mL). The precipitate was collected in a fritted glass funnel and reprecipitated from THF (5 mL) into cold methanol (150 mL) and recollected in a fritted glass funnel. The dry polymer was then dissolved in THF (20 mL) and passed through basic alumina to remove any remaining copper. The solvent was then removed by rotary evaporation and reprecipitated from THF (5 mL) into cold methanol (150 mL) to yield 0.60 g (30%) of PLA-g-PMMA as a white solid; $GPC_{PSt}\ M_n=5.00\times10^4$, $Đ=1.57$; $GPC_{LS}\ M_n=5.38\times10^4$, $Đ=1.15$.

What is claimed is:

1. A method of preparing a functionalized a polymer comprising:
   supplying a polyester with α-halogenated groups and a carboxylic acid chain end;
   converting the carboxylic acid chain end of the polyester to an acyl chain end to prepare a polyester with α-halogenated groups and an acyl chain end; and
   functionalizing at least one of the α-halogenated groups.

2. The method of claim 1, where the conversion of the carboxylic acid chain end of the polyester to an acyl chain end is performed by first reacting the carboxylic acid chain end with N,N-dimethylchlorosulfitemethaniminium chloride to form an aprotic functional group and then replacing the aprotic functional group with a nucleophile.

3. A method of preparing a coupled polymer comprising:
   mixing a plurality of polyesters with α-halogenated groups and a carboxylic acid chain end with N,N-dimethylchlorosulfitemethaniminium chloride.

4. The method of claim 3, where the plurality of polyesters with α-halogenated groups and a carboxylic acid chain end has an average molecular weight (Mn) prior to the step of mixing with N,N-dimethylchlorosulfitemethaniminium chloride, and the average molecular weight is double after the step of mixing with N,N-dimethylchlorosulfitemethaniminium chloride.

5. A method of crosslinking an α-halogenated polymer comprising:
   inducing the formulation of a dioxolenium ion intermediate in an α-halogenated polymer that includes a unit defined by the formula

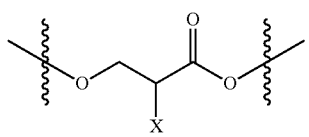

where X is a halogen atom, and
reacting the dioxolenium ion intermediate with an activated aromatic ring or an activated polyaromatic compound.

6. The method of claim 5, where the α-halogenated polymer is an α-halogenated polyester.

7. The method of claim 5, where the α-halogenated polymer is a hyperbranched α-halogenated polymer.

8. The method of claim 5, where the step of inducing the formulation of a dioxolenium ion intermediate is performed by in the presence of a silver salt.

9. The method of claim 5, where the step of inducing the formulation of a dioxolenium ion intermediate is performed by heating the α-halogenated polymer.

10. The method of claim 5, where the dioxolenium ion intermediate is reacted with an activated polyaromatic compound and the activated polyaromatic compound is defined by the formula;

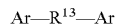

where each Ar is individually an aromatic group and $R^{13}$ is an electron-donating organic group.

11. A method of functionalizing an α-halogenated polymer comprising:
   inducing the formulation of a dioxolenium ion intermediate in an α-halogenated polymer that includes a unit defined by the formula

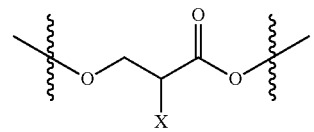

where X is a halogen, and
reacting the dioxolenium ion intermediate with an activated aromatic ring.

12. The method of claim 11, where the α-halogenated polymer is an α-halogenated polyester.

13. The method of claim 11, where the α-halogenated polymer is a hyperbranched α-halogenated polymer.

14. The method of claim 11, where the step of inducing the formulation of a dioxolenium ion intermediate is performed by in the presence of a silver salt.

15. The method of claim 11, where the step of inducing the formulation of a dioxolenium ion intermediate is performed by heating the α-halogenated polymer.

16. The method of claim 11, where the activated aromatic ring is defined by the formula;

where Ar is an aromatic group and $R^{14}$ is an electron-donating organic group.

17. A method of preparing an α-halogenated polymer with a polymeric or oligomeric side-chain comprising:
   supplying monomer;
   initiating the monomer by producing a dioxolenium ion intermediate in an α-halogenated polymer that includes a unit defined by the formula

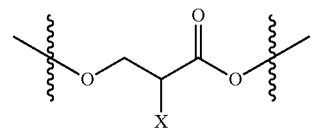

where X is a halogen atom.

18. The method of claim 17, where the α-halogenated polymer is an α-halogenated polyester.

19. The method of claim 17, where the α-halogenated polymer is a hyperbranched α-halogenated polymer.

20. The method of claim 17, where the step of inducing the formulation of a dioxolenium ion intermediate is performed by in the presence of a silver salt, and the polymerization of the monomer is initiated through cationic initiation.

21. The method of claim 17, where the step of inducing the formulation of a dioxolenium ion intermediate is performed by heating the α-halogenated polymer, and the polymerization of the monomer is initiated through cationic initiation.

22. A method of preparing a functionalized a polymer comprising:

reacting TEMPO compound and an α-halogenated polymer that includes a unit defined by the formula

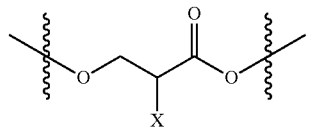

where X is a halogen atom.

23. The method of claim 22, where the TEMPO compound is defined by the formula:

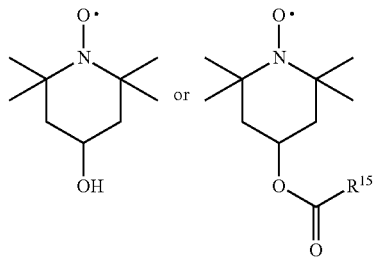

where $R^{15}$ is a monovalent organic group.

* * * * *